(No Model.)  2 Sheets—Sheet 1.
L. D. WHITTEN.
DRAFT EQUALIZER.

No. 579,248.  Patented Mar. 23, 1897.

Witnesses  
Wm. F. Doyle.  
H. F. Tunis

Inventor  
Lorenzo D. Whitten.  
By H. B. Willson.  
Attorney (No Model.) 2 Sheets—Sheet 2.

L. D. WHITTEN.
DRAFT EQUALIZER.

No. 579,248. Patented Mar. 23, 1897.

Witnesses
Wm F. Doyle
H. J. Ennis

Inventor
Lorenzo D. Whitten.
By H. B. Willson,
Attorney

UNITED STATES PATENT OFFICE.

LORENZO DOW WHITTEN, OF BEVERLY, ILLINOIS.

DRAFT-EQUALIZER.

SPECIFICATION forming part of Letters Patent No. 579,248, dated March 23, 1897.

Application filed October 21, 1896. Serial No. 609,596. (No model.)

*To all whom it may concern:*

Be it known that I, LORENZO DOW WHITTEN, a citizen of the United States, residing at Beverly, in the county of Adams and State of Illinois, have invented certain new and useful Improvements in Draft-Equalizers; and I do declare the following to be a full, clear, and exact description of the invention, such as will enable others skilled in the art to which it appertains to make and use the same.

My invention has relation to improvements in draft-equalizers for double teams, and the object is to provide a device of this class for practically and effectually equalizing the draft of a double team.

To this end the novelty consists in the construction, combination, and arrangement of the same, as will be hereinafter more fully set forth, and particularly pointed out in the claims.

In the accompanying drawings the same figures of reference indicate the same parts of the invention.

Figure 1:
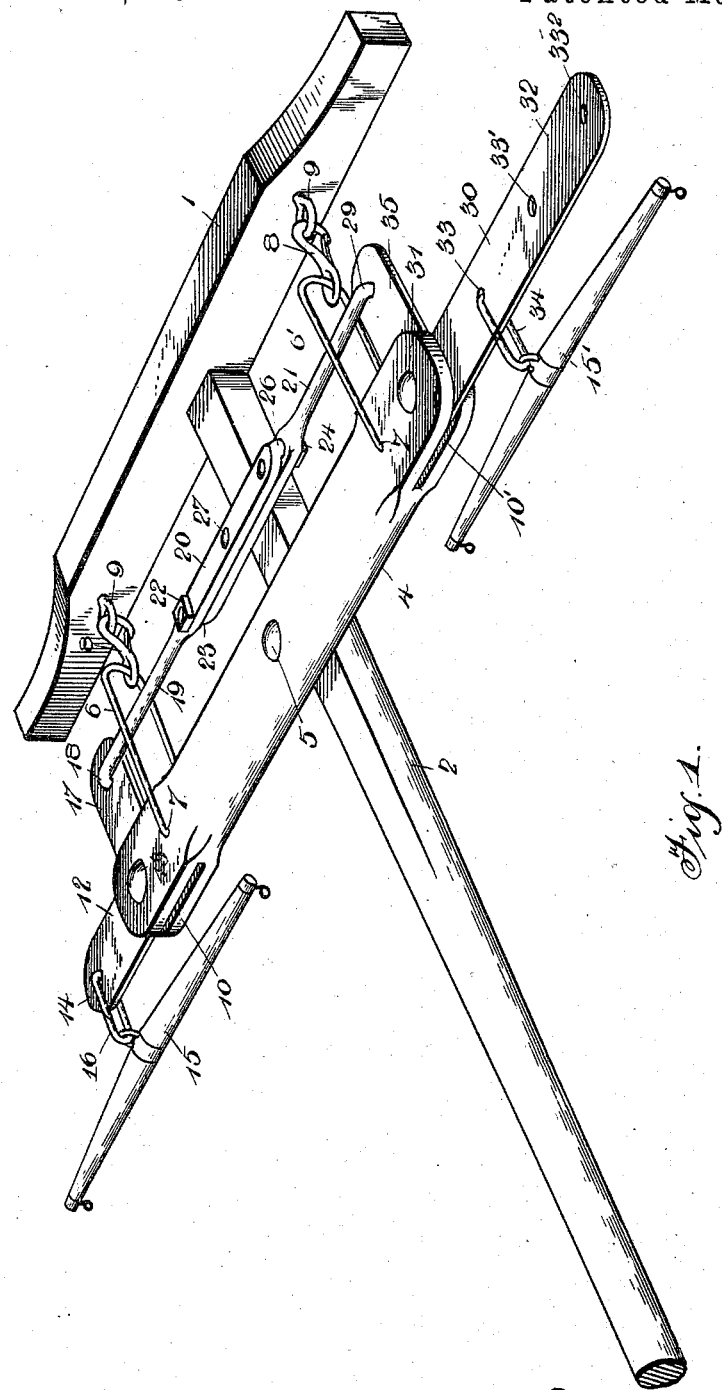
Figure 2:
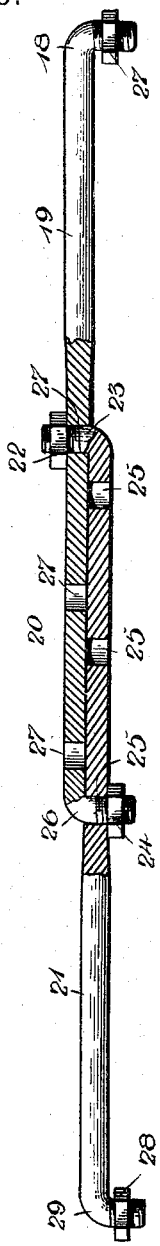
Figure 3:
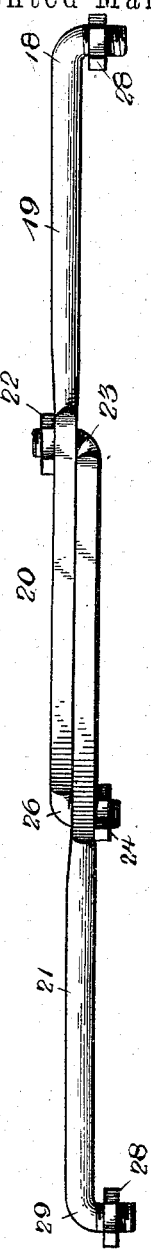

Figure 1 is a perspective view of my improved draft-equalizer. Fig. 2 is a transverse section on the line of the adjustable connecting-rod, and Fig. 3 is a rear elevation of said rod.

1 represents the front axle; 2, the tongue or pole, and 4 the doubletree, centrally pivoted to the tongue by a bolt 5.

6 6' represent stay-links, the forward ends of which pass through vertical holes 7 7 in the doubletree, and their rear ends are each provided with a snap-hook 8, by means of which they are detachably secured to eyebolts 9 on the axle 1.

10 10' are horizontal slots in the opposite ends of the doubletree, and in the slot 10 is horizontally fulcrumed an angle-lever 12 by means of a bolt 13, and to the outer arm 14 of said lever is connected a singletree 15 by an open link 16, while to the rear arm 17 is pivoted the angular arm 18 of the member 19 of the adjustable connecting-rod 20. An angle-lever 30 is likewise fulcrumed by a bolt 31 in the slot 10' in the opposite end of the doubletree, and its longer arm 32 is provided with a series of orifices 33, 33', and 33², in any one of which is secured the open link 34, the opposite end of which is pivoted to a singletree 15'. The shorter rear arm 35 of said angle-lever 30 is pivoted to the angular arm 29 of the member 21 of the connecting-rod 20, and the ends of each of the arms 18 29 are screw-threaded to receive a nut 28.

The inner end of the member 19 of the connecting-rod 20 is rectangular in cross-section and is provided with a series of vertical holes 27, and its immediate end terminates in a downwardly-projecting arm 26, which engages one of the adjusting-holes 25 in the corresponding rectangular portion of the member 21 and is adjustably secured therein by a nut 24. The arm 23 of the member 21 is likewise adjustably secured in one of the holes 27 of the member 19 by a nut 22.

Assuming that an animal of ordinary draft capacity is hitched to the singletree 15, an animal of equal draft capacity would be hitched to the singletree 15', adjusted to the hole 33', while if said second animal be below the standard the singletree will be connected in the outer hole 33², and if above the standard to the hole 33, which equalizes the difference in draft capacity of the team.

In hitching up a triple team abreast the singletree 15 is detached and an ordinary doubletree, with two singletrees attached, is substituted and the singletree 15' adjusted accordingly.

My improved draft-equalizer will be found very convenient in breaking colts by first hitching them to the singletree 15', adjusted to the outer hole of the angle-plate 30, and, as they learn to draw and their strength increases, gradually moving the singletree inward until about equal to the draft of the animal on the other tree 15.

The device is especially adapted to the various farm implements, such as drills, planters, rollers, and the like, insuring a steady and even pull at all times.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A draft-equalizer, comprising the axle 1, tongue 2, and the doubletree 4 centrally secured to the tongue 2 by a bolt 5, and having its outer ends connected to the axle by stay-links 6 6′, provided with snap-hooks 8 engaging the eyebolts 9 secured to said axle, in combination with the adjustable connecting-rod 20, the outer ends of which are secured to the angle-levers 12 30, fulcrumed in horizontal slots in the outer ends of the doubletree 3, substantially as shown and described.

2. A draft-equalizer, comprising the axle, the tongue and the doubletree 4, the outer ends of which are provided with horizontal slots 10 10′, the angle-levers 12 30 fulcrumed therein, the lever 12 having arms of equal length and the lever 30 arms of unequal length, in combination with the adjustable connecting-rod 20 connecting the rear arms of said levers and comprising the member 19 having a plane portion provided with vertical holes 27 and a depending arm 26 provided with a nut 24, the corresponding member 21 having the plane portion provided with adjusting-holes 25, and a vertical arm 23 provided with a nut 22, substantially as shown and described.

3. A draft-equalizer, comprising the axle, the tongue, and the doubletree provided with a horizontal slot 10, in which is fulcrumed the angle-lever 12, having arms of equal length, and a horizontal slot 10′ in which is fulcrumed the angle-lever 30 having a shorter arm 35, and a longer arm 32 provided with a series of adjusting-holes 33, 33′, 33², in combination with the adjustable rod 20 connecting said angle-levers, and comprising the members 19 and 21, detachably and adjustably secured together, substantially as shown and described.

In testimony whereof I hereunto affix my signature in presence of two witnesses.

LORENZO DOW WHITTEN.

Witnesses:
JAMES MIKESELL,
JOHN ANDREW, Jr.